(No Model.) 2 Sheets—Sheet 1.

N. S. ANDREWS.
CREAM TESTING CHURN.

No. 320,426. Patented June 16, 1885.

WITNESSES:
Norris A. Clark
Jno. C. Schroeder

INVENTOR,
Nathaniel S. Andrews
by Geo. W. Dyer
Atty.

N. PETERS, Photo-Lithographer, Washington, D. C.

(No Model.) 2 Sheets—Sheet 2.
N. S. ANDREWS.
CREAM TESTING CHURN.
No. 320,426. Patented June 16, 1885.
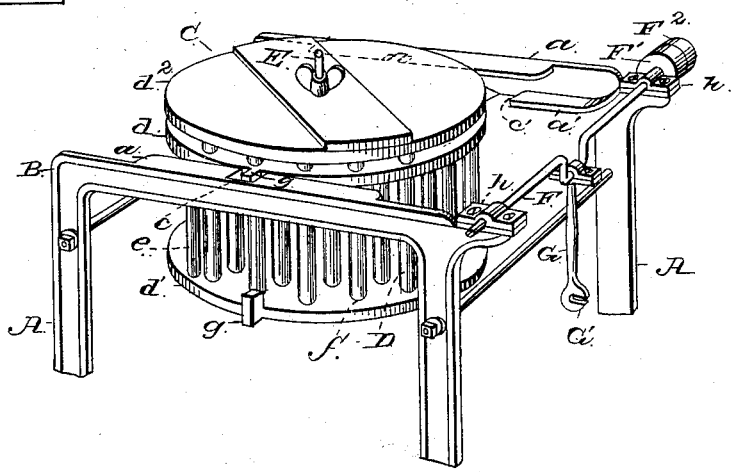
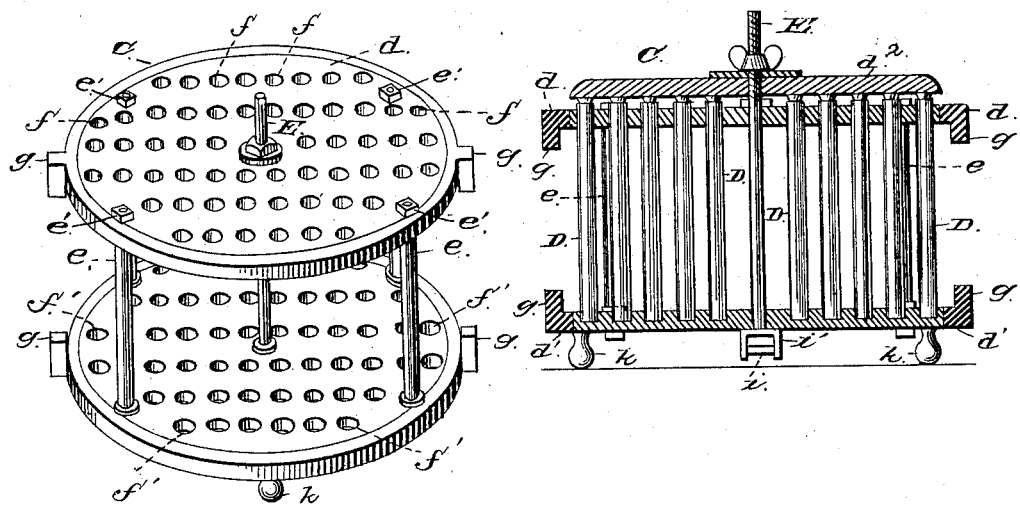
WITNESSES:
Norris A. Clark.
Jno. C. Schroeder
INVENTOR
Nathaniel S. Andrews
by Geo. W. Dyer
atty.

UNITED STATES PATENT OFFICE.

NATHANIEL S. ANDREWS, OF DUBUQUE, IOWA, ASSIGNOR OF ONE-HALF TO HIRAM F. BURNAP, OF SAME PLACE.

CREAM-TESTING CHURN.

Specification forming part of Letters Patent No. 320,426, dated June 16, 1885.

Application filed February 14, 1885. (No model.)

*To all whom it may concern:*

Be it known that I, NATHANIEL S. ANDREWS, of Dubuque, in the county of Dubuque, and State of Iowa, have invented a new and useful Improvement in Cream-Testing Churns; and I do hereby declare that the following is a full and exact description of the same, reference being had to the accompanying drawings and to the letters of reference marked thereon.

In butter-factories, where a sample of the milk or cream is first churned and tested to ascertain what amount of butter is actually contained in all of the milk or cream from which the sample is taken, and where the milk or cream is daily delivered by agents who collect it from dairymen on their respective routes, it is very necessary that all of the day's gathering should be churned and tested at the same time, and to do this a churn is required which will accommodate many samples independently of each other, so that at the end of the day the manufacturer knows exactly what amount of butter is contained in the milk or cream furnished by each dairyman.

To this class of churns relates my invention, which has in view increased facilities and efficiency over others of its character, and which is more particularly adapted to carry out the process of testing milk and cream described in my application for Letters Patent filed March 18, 1884, serial No. 124,691.

The novelty of my churn consists in the construction and arrangement of its component parts, as will be hereinafter described in detail and set forth in the claims, and for a more perfect understanding of these features, together with the mode of operation, reference should be had to the accompanying drawings, in which—

Figure 1:
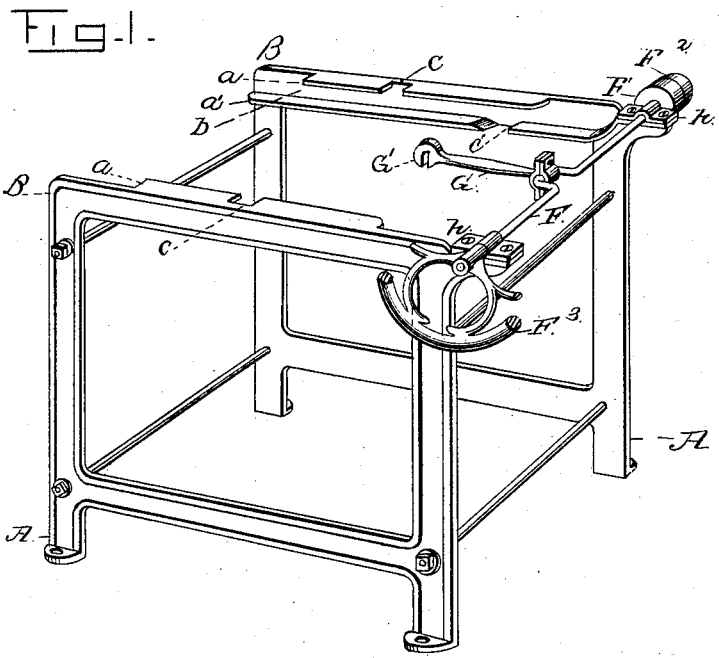
Figure 2:
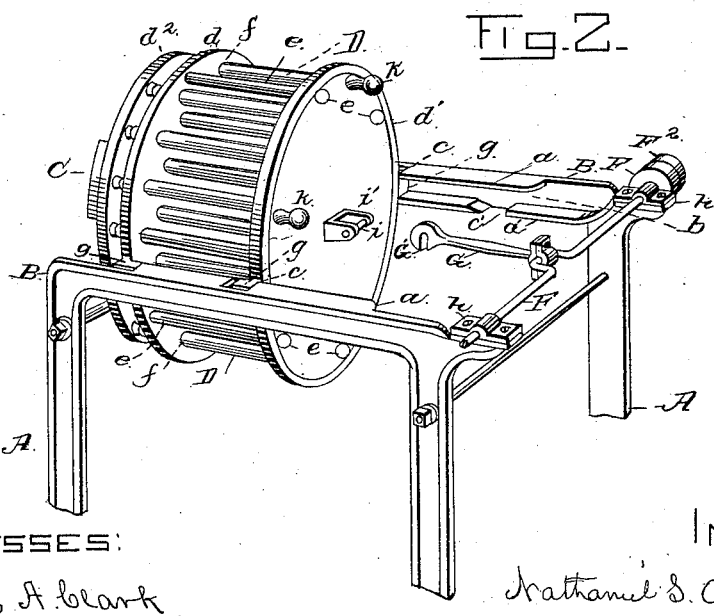

Figure 1 is a view of the supporting framework and motive mechanism; Fig. 2, a similar view with the addition of the frame for holding the vessels which contain the samples of milk or cream; Fig. 3, a similar view showing the said frame in the position it is made to assume when the operation of churning is completed; Fig. 4, a view in detail of the frame for holding the vessels which contain the samples of milk or cream; and Fig. 5 a vertical section of the same, showing the position of these vessels.

Like letters of reference denote corresponding parts in each of the views.

A denotes the supporting-frame, which is preferably adapted to be secured by bolts or screws to the floor of the factory. The upper cross-beams, B B, of this frame run parallel with each other lengthwise of the machine, and each of these beams has two parallel flanges, $a, a'$, between which is formed a groove, $b$, for a purpose hereinafter specified. The upper flanges, $a\ a$, are each provided with a slot, $c$, cut in their edges at points diametrically opposite, and the lower flanges, $a'\ a'$, are each provided with a slot, $c'$, arranged likewise. These lower flanges, $a'\ a'$, extend along the entire length of the beams B B, while the upper flanges, $a\ a$, terminate at their outer ends at points the same distance from their slots $c$ as the distance is from said slots to the slots $c'$ in the lower flanges, $a'\ a'$, and the edge of each slot $c'$, next to the slot $c$ in the flange above, is beveled downwardly or inclined, as shown in Fig. 1, and for a purpose hereinafter made manifest.

The frame C, or churn proper, which holds the tubes or vessels containing the samples of milk or cream to be tested, is composed principally of two (preferably cylindrical) disks, $d$ and $d'$, rigidly connected and held apart by several rods or bolts $e\ e$, screw-threaded on one end to receive tightening-nuts $e'\ e'$.

The bottom or inner disk, $d'$, is provided on its upper side with a series of recesses, $f'$, which should conform to the shape of the tubes or vessels containing the samples of the milk or cream, while the top or outer disk, $d$, is provided with a corresponding series of perforations, $f$, on a line with the recesses $f'$ of the bottom disk.

The tubes or vessels D, (which are transparent, or should be partially so, lengthwise,) when supplied with the samples of the milk or cream to be tested, are inserted through the perforations $f$ of the disk $d$, and are seated in the corresponding recesses in the disk $d'$. These tubes or vessels should be of such a length that when placed in position in the frame C their necks will just protrude through the perforations of the disk $d$, and in order to secure them against any movement independent of that imparted by the motive mechanism, an additional disk, $d^2$, is applied to the outside of the upper or outer disk, $d$, against the corks or stoppers employed to close the mouths or openings of the tubes or vessels. This covering or fastening disk $d^2$ is secured by means of a bolt or rod, E, passing centrally through it and the disks $d$ and $d'$. This bolt or rod E is screw-threaded on its outer or upper end, and by means of a thumb-nut, $E^1$, the covering or fastening disk $d^2$ is forced down with equal pressure upon the corks or stoppers of all the tubes or vessels D.

When all the tubes or vessels containing the samples of milk or cream have been placed in the frame C, and the covering and fastening disk has been properly applied and secured, this frame or churn proper is so placed on the supporting-frame A, between the beams B B, that the tubes or vessels D shall occupy a horizontal position, and this frame C is suspended by means of guides or lugs $g\ g\ g\ g$, which fit loosely within the grooves $b$, between the upper and lower flanges, $a\ a'$, of each beam B of the supporting-frame. The disk $d$ of the frame C has a pair of these lugs or guides, $g\ g$, secured or cast upon its periphery at points diametrically opposite, and the disk $d'$ has also a pair of these lugs or guides, $g\ g$, provided and arranged upon its periphery in the same way.

In mounting the frame C the lugs or guides $g\ g$ of the bottom or inner disk, $d'$, are inserted in the grooves $b\ b$, through the slots $c\ c$ of the upper flanges, $a\ a$, while the lugs or guides of the top or outer disk, $d$, pass the outer terminus of these upper flanges, $a\ a$, and have bearings upon the lower flanges, $a'\ a'$, as shown in Fig. 2. In the absence of bolts or rods for transversely connecting the ends of the supporting-frame A, this frame or churn C, with its tubes or vessels, could be mounted in the grooves $b\ b$ by inserting the lugs or guides $g\ g$ between the flanges $a\ a$ and $a'\ a'$, at the outer ends of the same; but otherwise it is mounted in the way described, and this, it will be seen, necessarily requires the space between the disks $d$ and $d'$ to be equal to the distance between the outer terminus of the upper flanges, $a\ a$, and their slots $c$.

On the inner end of each beam B is secured a journal box, $h$, and in these boxes a crank-shaft, F, has bearings, as shown in Fig. 1. This crank-shaft has on one end a fixed and loose pulley, $F'\ F^2$, with belt-connection with the driving-power, or instead, a crank convenient for handling may be substituted, and upon the other end of this shaft is mounted a fly-wheel, $F^3$.

One end of a pitman, G, is loosely connected with the center of the crank-shaft F, and its other end, G', (which is hooked, as shown,) connects with a pin, $i$, which passes through a bracket, $i'$, secured to the lower end of the bolt or rod E, which passes through the center of the disks comprising the frame or churn C. This connection assists in maintaining the horizontal position of the frame or churn C and its tubes or vessels D.

When revolution is imparted to the crank-shaft F, the frame or churn C, with its tubes or vessels, is reciprocated back and forth between the beams B B of the supporting-frame, and the lugs or guides $g\ g$ on the bottom or inner disk, $d'$, are prevented from entering the slots $c'\ c'$ in the lower flanges, $a'\ a'$, by the pitman G, which should be of such a length as to limit the backward movement of the frame or churn C accordingly.

When the samples of milk or cream contained in the tubes or vessels have been reduced to butter, the attendant detaches the hooked end of the pitman G and moves the frame or churn C back until the lugs or guides on the bottom or inner disk, $d'$, reach the slots $c'\ c'$ of the lower flanges, when they pass through said slots, assisted by the bevel or incline on one side of said slots, and the frame or churn C swings down and assumes a vertical position.

In moving the frame or churn C back, as just mentioned, when the lugs or guides on its disk $d'$ reach the slots $c'\ c'$ of the lower flanges, $a'\ a'$, the lugs or guides of the disk $d$ reach the slots $c\ c$ in the upper flanges, $a\ a$, and when this frame or churn falls and swings to a vertical position, the lugs on this upper or outer disk, $d$, are forced endwise up into the slots $c\ c$ of the upper flanges, and the frame or churn C is thereby held suspended between the beams B B and free from lateral movement in either direction.

The frame or churn C remains in this position until its removal is desired, when it is swung back into the grooves $b$, and then withdrawn through the slots $c\ c$ in the upper flanges.

The bottom disk of the frame C is preferably provided with feet or knobs $k\ k\ k$, (longer than the bracket $i'$,) whereby the frame or churn C can be placed upon its base without the interference of the said bracket $i'$.

The advantages which this churn is believed to possess are those of efficiency combined with simplicity and cheapness.

Having thus described my invention, what I claim as new therein, and desire to secure by Letters Patent, is—

1. The combination, with a churn-body having lugs, of the supporting-frame A, with beams B B, having upper flanges, $a$, provided with slots, $c$, and lower flanges, $a'$, provided with slots $c'$, arranged substantially as and for the purposes set forth.

2. The frame or churn C for holding the milk or cream vessels, consisting of the perforated disk $d$, the correspondingly-recessed disk $d'$, the intermediate connecting rods or bolts, $e$, the center rod or bolt, E, and its nut E', and the covering or fastening disk $d^2$, combined substantially as and for the purposes set forth.

3. The combination of the frame or churn C, provided with the guides or lugs $g$ $g$, and the supporting-frame A, with beams B B, having the flanges $a$, provided with the slots $c$, and the lower flanges, $a'$, provided with the slots $c'$, beveled on one side, substantially as described and for the purposes set forth.

4. The frame or churn C, having the center rod or bolt, E, provided with bracket $i'$ and pin $i$, and the supporting frame A, provided with the crank-shaft F, gearing for driving said shaft, and a connecting-pitman, G, having the hooked end $G'$, all combined and arranged substantially as and for the purposes set forth.

In testimony whereof I affix my signature in presence of two witnesses.

NATHANIEL S. ANDREWS.

Witnesses:
 JNO. O. SCHROEDER,
 GEO. H. COOPER, Jr.